United States Patent [19]

Hauk

[11] Patent Number: 4,755,219
[45] Date of Patent: Jul. 5, 1988

[54] PROCESS FOR PRODUCING MOLTEN PIG IRON OR STEEL RAW MATERIAL

[75] Inventor: Rolf Hauk, Düsseldorf, Fed. Rep. of Germany

[73] Assignee: Korf Engineering GmbH, Dusseldorf, Fed. Rep. of Germany

[21] Appl. No.: 3,277

[22] Filed: Jan. 14, 1987

[30] Foreign Application Priority Data

Feb. 5, 1986 [DE] Fed. Rep. of Germany ....... 3603894

[51] Int. Cl.$^4$ .......................... C22B 4/00; C22B 1/10
[52] U.S. Cl. ......................................... 75/10.22; 75/26
[58] Field of Search ................................. 75/10.22, 26

[56] References Cited

U.S. PATENT DOCUMENTS

| 3,993,473 | 11/1976 | MacRae | 75/26 |
| 4,396,421 | 8/1983 | Stift | 75/26 |
| 4,469,508 | 9/1984 | Amouroux | 75/26 |

Primary Examiner—Peter D. Rosenberg

[57] ABSTRACT

A process for producing molten pig iron or steel raw material in which iron oxide-containing, preferably pre-reduced raw material particles are introduced from above into a fluidized bed formed from carbonaceous solid particles and an oxygen-containing carrier gas. When the fluidized bed passes through in countercurrent to the carrier gas, the solid particles are heated, reduced and melted. The fluidized bed receives additional energy through plasma heating, in such a way that the plasma energy is supplied level with the entry of the oxygen-containing carrier gas into the fluidized bed.

6 Claims, 1 Drawing Sheet

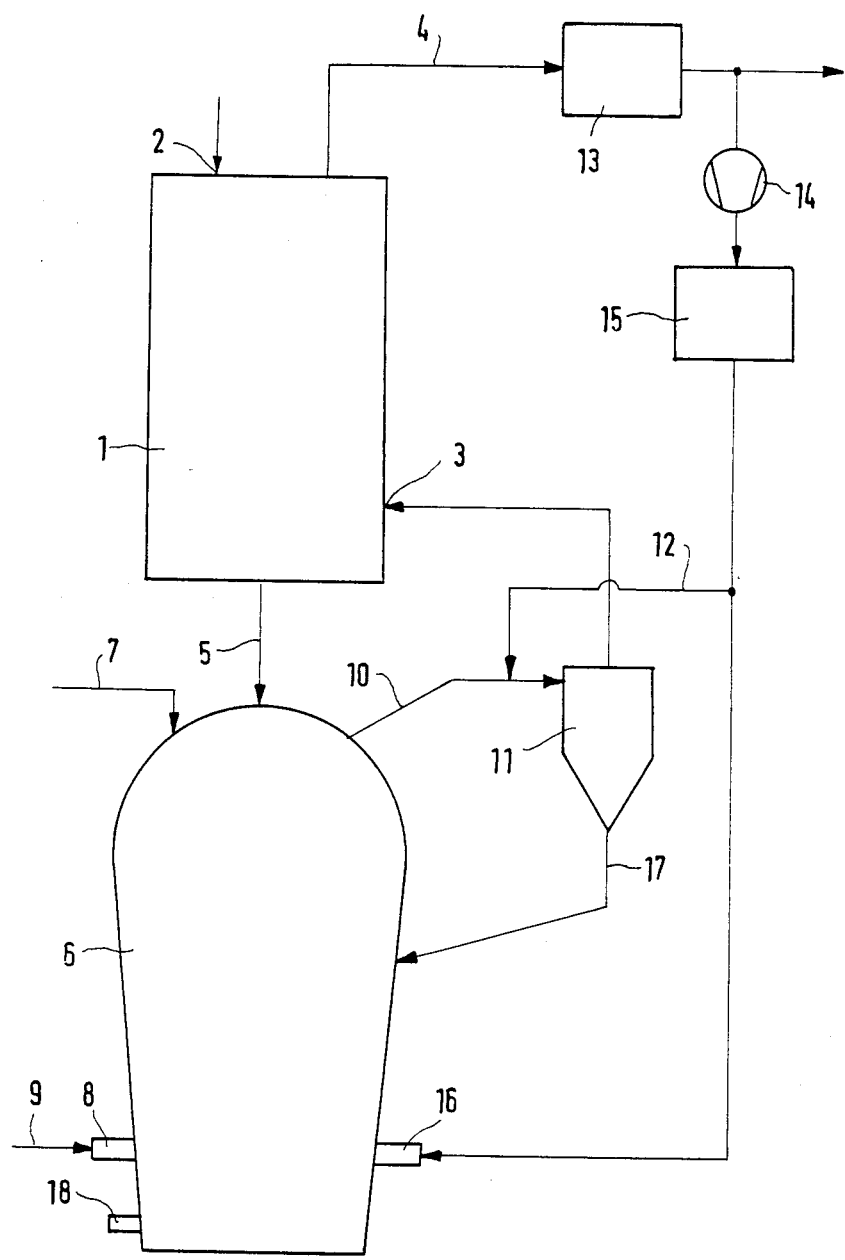

PROCESS FOR PRODUCING MOLTEN PIG IRON OR STEEL RAW MATERIAL

The invention relates to a process for producing molten pig iron or steel raw material from iron oxide-containing raw material particles.

EP No. 0 037 809 B1 discloses a process for the production of molten pig iron or steel raw material form iron oxide-containing raw material particles, particularly prereduced iron ore, in which the iron oxide-containing raw material particles are introduced from above into a fluidized bed formed from carbon or coal particles and an oxygen-containing carrier gas and on passing through the same are heated, reduced and melted. In order to achieve in said process a favourable energy utilization and therefore a low total energy use, additional energy is supplied to the fluidized bed by plasma heating, the latter taking place in the upper and/or following central portion of the fluidized bed, where a maximum fluidized bed temperature zone is produced and maintained. For this purpose plasma burners are used level with the fluidized bed in the wall of the melting crucible receiving the latter, being positioned in the upper and/or central height region of the melting crucible area filled by the fluidized bed. The additional introduction of energy by plasma heating is intended to make it possible, due to the energy transfer mainly taking place by radiation, as a result of the high plasma gas temperature, to significantly reduce the total amount of energy used. Due to the fact that the plasma heating takes place in the upper and/or central region of the fluidized bed following on to the same, a maximum fluidized bed temperature zone is to be produced and maintained there, so that the temperature is kept relatively low just above the slag bath surface and a reoxidation of the reduced and already melted iron ore particles just prior to passing through the slag bath is to be avoided.

However, it has been found that the introduction of plasma energy into the upper and/or central region of the fluidized bed through a corresponding arrangement of plasma burners does not lead to a transfer of said energy into the melting zone and instead merely increases the temperature of the gas from the fluidized bed or melting crucible. However, the melting zone is located above the molten slag layer in the vicinity of the plane into which flows the oxygen-containing carrier gas through nozzles fitted laterally in the melting crucible wall. The plasma energy does not act in said zone, so that there is no improved energy utilization or a reduction in the total amount of energy used. It has also been found that a reoxidation of the reduced and already melted iron ore particles does not occur even at high melting temperatures upstream of the blow-in nozzles for the carrier gas.

The problem of the present invention is therefore to improve the known process in such a way that the total energy supplied is more effectively used.

According to the invention, this problem is solved by the fact that the plasma energy is fed into the fluidized bed level with the entry of the oxygen-containing carrier gas.

It is advantageous to use the oxygen-containing carrier gas forming the fluidized bed as the plasma-forming gas. In the case of a relatively simple melting crucible construction, this leads to an optimum utilization of the carrier gas. If the iron oxide-containing raw material particles are prereduced in a reducing unit, a particularly economic procedure is obtained in that the process gas removed from the reducing unit is used as the plasma-forming gas following dust removal and $H_2O$ and $CO_2$-removal. This prepared process gas can be supplied to the fluidized bed, in addition to the oxygen-containing carrier gas, by means of plasma or $O_2$-burners above the entry point of the carrier gas into said fluidized bed.

The invention is described in greater detail hereinafter relative to the embodiment shown in the drawing. The latter is a diagrammatic representation of a plant for reducing iron ore to molten pig iron or steel raw material.

Preferably lumpy iron ore is introduced from above via an inlet 2 into a reducing shaft furnace 1. Reducing gas is supplied by preferably circularly arranged inlets 3 into the lower part of the reducing shaft furnace 1. The reducing gas rises in the shaft furnace 1 and reduces the iron ore dropping downwards in counter flow. At the upper end of the shaft furnace 1 the process gas containing a considerable proportion of $CO_2$ and $H_2O$ as a result of the reduction of the iron ore, is removed by means of a line 4. The iron ore preferably prereduced to an iron content between 45 and 95% is drawn off as sponge iron from the bottom of the shaft furnace 1 using a line 5. The sponge iron is fed from above into a melt-down gasifier 6 through line 5. In addition, fine to coarse-grained coal is supplied by a line 7 to the top region of the melt-down gasifier 6.

Oxygen or oxygen-containing gas is blown as the carrier gas into melt-down gasifier 6 from a line 9 by means of plasma burners 8 distributed round the circumference of gasifier 6 at the same height. The plasma burners 8 are located in the lower zone of the melt-down gasifier 6 and the rising carrier gas forms a fluidized bed with the sponge iron and coal. The coal is gasified by the oxygen in the fluidized bed. The $CO_2$ and $H_2O$-containing gas passing out of gasifier 6 is passed by means of a line 10 to a cyclone 11 where it is freed from entrained solid particles, such as coal and ash. The gas passing out of cyclone 11 is blown by means of inlets 3 into shaft furnace 1 and serves as a reducing gas for the iron ore. The gas passing out of the melt-down gasifier 6 has a temperature of approximately 1050° C. However, the suitable reducing gas temperature is approximately 850° C. Therefore, a line 12 issues into line 10 for the purpose of supplying cooling gas, so that the gas entering cyclone 11 has a temperature of 850° C. The cooling gas is obtained from the process gas removed from shaft furnace 1. This initially passes via line 4 into a washer 13, which largely frees it from dust and $H_2O$, then into a compressor 14 and finally into a $CO_2$ washer 15, where the $CO_2$ is removed from the gas. Part of this prepared process gas serves as cooling gas for the reducing gas, whilst the remainder is used as plasma-forming gas for the at least one further plama burner 16. Plasma burner 16 can be positioned at the same height or slightly above plasma burner 8. Only that process gas quantity is prepared as is required as cooling gas for the reducing gas and as plasma-forming gas. The remaining process gas is branched off downstream of washer 13 and is supplied to another use.

The solid particles separated in cyclone 11 are conveyed back by means of a line 17 into melt-down gasifier 6 level with the fluidized bed. Here again feeding into melt-down gasifier 6 can take place by means of not shown plasma burners. In the bottom region of gasifier 6 there are tapholes 18 for the molten slag and the molten pig iron.

Through the supply of plasma energy to the lower part of the fluidized bed, it is ensured that this energy is completely used for melting the sponge iron. It is also ensured that the molten sponge iron or molten pig iron is not cooled again in the lower part of the fluidized bed, as would have to be feared in the case of an arrangement of plasma burners in the upper or central region of said bed. Thus, an ideal temperature distribution over the height of the fluidized bed is obtained, so that there is maximum energy utilization.

An additional control of the temperature distribution can be achieved in that carbon carriers in solid and/or liquid and/or gaseous form are supplied to the melt-down gasifier 6 by means of the plasma burners. The energy-economizing operation of the melt-down gasifier is e.g. revealed by the fact that when using open-burning coal, the consumption thereof is approximately 500 kg/t of pig iron, whereas it would be approximately 1000 kg/t of pig iron if no plasma burners were used and no process gas return took place.

What is claimed is:

1. A method of producing molten pig iron or steel raw material from iron oxide containing raw material particles, comprising the steps of: forming a fluidized bed of carbonaceous solid particles and an oxygen-containing carrier gas; introducing the iron oxide containing raw material particles into the fluidized bed from above; introducing the oxygen container carrier gas into the fluidized bed at a horizontal level located in a lower region of the fluidized bed; heating, reducing, and melting the iron oxide containing particles when passing through the fluidized bed, and plasma heating the fluidized bed by supplying a plasma-forming gas to the bed essentially at said horizontal level.

2. A method according to claim 1, wherein the oxygen-containing carrier gas is used as the plasma-forming gas.

3. A method according to claim 1 or 2, comprising prereducing the iron oxide-containing raw material particles in a reducing unit, withdrawing process gas from the reducing unit, removing dust and $H_2O$ and $CO_2$ from the withdrawn process gas, to thereby obtain clean process gas, and using the clean process gas as plasma-forming gas.

4. A method according to claim 3, wherein the clean process gas is fed into the fluidized bed by plasma burners or $O_2$ burners located at said horizontal level.

5. A method according to claim 3, wherein the dust is removed in a cyclone, and the dust is returned to the fluidized bed.

6. A method according to claim 5, wherein the dust is returned to the fluidized bed by plasma burners.

* * * * *